(12) United States Patent
Drucker et al.

(10) Patent No.: US 12,284,267 B2
(45) Date of Patent: Apr. 22, 2025

(54) FULLY HOMOMORPHIC ENCRYPTION FOR FIXED-POINT ELEMENTS

(71) Applicant: International Business Machines Corporation, Armonk, NY (US)

(72) Inventors: Nir Drucker, Zichron Yaakov (IL); Guy Moshkowich, Nes Ziyona (IL); Tomer Pelleg, Haifa (IL); Hayim Shaul, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 18/102,735

(22) Filed: Jan. 29, 2023

(65) Prior Publication Data
US 2024/0275577 A1    Aug. 15, 2024

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
None
See application file for complete search history.

(56) References Cited

U.S. PATENT DOCUMENTS

| | | | |
|---|---|---|---|
| 2012/0213359 A1* | 8/2012 | Troncoso Pastoriza | ....................... H04L 9/008 380/28 |
| 2016/0330017 A1* | 11/2016 | Youn | ........................ H04L 9/304 |
| 2017/0134156 A1* | 5/2017 | Laine | ....................... H04L 9/008 |
| 2018/0048459 A1 | 2/2018 | Ding | |
| 2020/0099393 A1* | 3/2020 | Xu | .......................... H03M 13/13 |
| 2021/0081785 A1* | 3/2021 | Sakai | ....................... G06N 3/045 |
| 2022/0166607 A1 | 5/2022 | Ratha | |
| 2022/0255720 A1 | 8/2022 | Sehrawat | |

FOREIGN PATENT DOCUMENTS

CN        108809619 A        11/2018

OTHER PUBLICATIONS

Joye, Mark. "Homomorphic Encryption 101". posted at <https://www.zama.ai/post/homomorphic-encryption-101> on Dec. 1, 2021. (Year: 2021).*

(Continued)

*Primary Examiner* — Scott B Christensen
(74) *Attorney, Agent, or Firm* — Randy Tejeda

(57) ABSTRACT

A computer-implemented method comprising: receiving, as input, a ciphertext x representing a computational result of an approximated fully-homomorphic encryption (FHE) scheme, wherein ciphertext x comprises an underlying number m and an accumulated computational error e; iteratively, (i) performing a bit extraction operation to extract a current most significant bit (MSB) x' of ciphertext x, (ii) calculating accuracy parameters $\alpha$, $\beta$ associated with x'; (iii) applying a step function to the extracted MSB x', based, at least in part, on the calculated accuracy parameters $\alpha$, $\beta$, to reduce or remove the accumulated computational error e and to return a clean MSB b, and (iv) repeating steps (i)-(iii) for all bits included in the underlying number m; and reconstructing and outputting, from all of the returned clean MSBs b, the number m.

20 Claims, 7 Drawing Sheets

(56) References Cited

OTHER PUBLICATIONS

Andrey Kim et al, "Approximate Homomorphic Encryption with Reduced Approximation Error"; In: Cryptographers' Track at the RSA Conference. pp. 120-144. Springer, Dec. 5, 2021.

Andrey Kim et al, "General Bootstrapping Approach for RLWE-based Homomorphic Encryption"; Online at: https://eprint.iacr.org/2021/691.pdf, Sep. 27, 2021.

Bae, Y. et al, "META-BTS: Bootstrapping Precision Beyond the Limit"; Cryptology, CCS '22: Proceedings of the 2022 ACM SIGSAC Conference on Computer and Communications Security, pp. 223-234, Nov. 7, 2022.

Bossuat, J.P. et al, "Efficient Bootstrapping for Approximate Homomorphic Encryption with Non-sparse Keys"; In: Canteaut, A., Standaert, F.X. (eds.) Advances in Cryptology—Eurocrypt 2021. pp. 587-617, Oct. 17-21, 2021.

Boura, C. et al, "Chimera: Combining Ring-LWE-based Fully Homomorphic Encryption Schemes"; Journal of Mathematical Cryptology 14(1), 316-338, May 11, 2020.

Chen, H. et al, "Improved Bootstrapping for Approximate Homomorphic Encryption"; In: Ishai, Y., Rijmen, V. (eds.) Advances in Cryptology—Eurocrypt 2019. pp. 34-54, May 19-23, 2019.

Cheon, J. et al, "Homomorphic Encryption for Arithmetic of Approximate Numbers"; In: Proceedings of Advances in Cryptology—Asiacrypt 2017. pp. 409-437. Springer Cham, Nov. 30, 2017.

Costache, A. et al, "On the precision loss in approximate homomorphic encryption"; Cryptology, Online at: https://eprint.iacr.org/2022/162, Feb. 12, 2022.

Gentry, C. et al, "Better bootstrapping in fully homomorphic encryption"; In: International Workshop on Public Key Cryptography, pp. 1-16. Dec. 15, 2011.

Jung Hee Cheon et al, "Efficient Homomorphic Comparison Methods with Optimal Complexity"; In: International Conference on the Theory and Application of Cryptology and Information Security. pp. 221-256. Springer, Feb. 11, 2020.

Jutla, C.S. et al, "Sine Series Approximation of the Mod Function for Bootstrapping of Approximate HE"; In: Dunkelman, O., Dziembowski, S. (eds.) Advances in Cryptology—Eurocrypt 2022. pp. 491-520, May 25, 2022.

Lee, E. et al, "Minimax Approximation of Sign Function by Composite Polynomial for Homomorphic Comparison"; IEEE Transactions on Dependable and Secure Computing, vol. 19, No. 6, pp. 3711-3727, Nov. 1-Dec. 2022.

Lee, J. et al, "Precise approximation of convolutional neural networks for homomorphically encrypted data"; Online at: arXiv preprint arXiv:2105.10879, Jun. 14, 2021.

Lee, Y. et al, "High-Precision Bootstrapping for Approximate Homomorphic Encryption by Error Variance Minimization"; In: Dunkelman, O., Dziembowski, S. (eds.) Advances in Cryptology—Eurocrypt 2022, pp. 551-580, Mar. 1, 2022.

Lu, W.j. et al, "Pegasus: Bridging Polynomial and Non-polynomial Evaluations in Homomorphic Encryption"; In: 2021 IEEE Symposium on Security and Privacy (SP). pp. 1057-1073, May 24-27, 2021.

Nir Drucker et al, "Bleach: Cleaning Errors in Discrete Computations over CKKS", Cryptology ePrint Archive, Paper 2022/1298, Sep. 2022, online at: https://eprint.iacr.org/2022/1298.

Seiko Arita et al, "Fully Homomorphic Encryption for Point Numbers"; In: Chen, K., Lin, D., Yung, M. (eds.) Information Security and Cryptology, pp. 253-270, Apr. 22, 2016.

\* cited by examiner

FULLY HOMOMORPHIC ENCRYPTION FOR FIXED-POINT ELEMENTS

BACKGROUND

The invention relates to the field of computerized cryptography, particularly homomorphic encryption.

Homomorphic encryption (HE) is a cryptographic system that allows computations to be made on encrypted data ("ciphertext"), without first decrypting the ciphertext. Under a homomorphic encryption scheme, these computations will yield the same results, when decrypted, as if they were performed on the data in its unencrypted form ("plaintext").

Approximated FHE schemes (such as CKKS) support computations for approximate arithmetic. In most steps of the approximated homomorphic computations, e.g., multiplication, re-linearization, or bootstrapping, some small error is added to the computations. Therefore, approximated FHE schemes are not considered to be "exact," and thus cannot be used to execute circuits with unbounded depth over discrete sets, such as binary or integer numbers, without error overflows. This may prevent the computation results from being properly decrypted, even in an approximate way. Thus, for most scenarios, approximated FHE schemes can only be considered a leveled homomorphic encryption (LHE) scheme, and not a fully homomorphic encryption (FHE) scheme.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a computer-implemented method comprising: receiving, as input, a ciphertext x representing a computational result of an approximated fully-homomorphic encryption (FHE) scheme, wherein ciphertext x comprises an underlying number m and an accumulated computational error e; iteratively, (i) performing a bit extraction operation to extract a current most significant bit (MSB) x' of ciphertext x, (ii) calculating accuracy parameters $\alpha$, $\beta$ associated with x'. (iii) applying a step function to the extracted MSB x', based, at least in part, on the calculated accuracy parameters $\alpha$, $\beta$, to reduce or remove the accumulated computational error e and to return a clean MSB b, and (iv) repeating steps (i)-(iii) for all bits included in the underlying number m; and reconstructing and outputting, from all of the returned clean MSBs b, the number m.

There is also provided, in an embodiment, a system comprising at least one hardware processor; and a non-transitory computer-readable storage medium having program code embodied therewith, the program code executable by the at least one hardware processor to: receive, as input, a ciphertext x representing a computational result of an approximated fully-homomorphic encryption (FHE) scheme, wherein ciphertext x comprises an underlying number m and an accumulated computational error e, iteratively, (i) perform a bit extraction operation to extract a current most significant bit (MSB) x' of ciphertext x, (ii) calculate accuracy parameters $\alpha$, $\beta$ associated with x', (iii) apply a step function to the extracted MSB x', based, at least in part, on the calculated accuracy parameters $\alpha$, $\beta$, to reduce or remove the accumulated computational error e and to return a clean MSB b, and (iv) repeat steps (i)-(iii) for all bits included in the underlying number m, and reconstruct and outputting, from all of the returned clean MSBs b, the number m.

There is further provided, in an embodiment, a computer program product comprising a non-transitory computer-readable storage medium having program code embodied therewith, the program code executable by at least one hardware processor to: receive, as input, a ciphertext x representing a computational result of an approximated fully-homomorphic encryption (FHE) scheme, wherein ciphertext x comprises an underlying number m and an accumulated computational error e; iteratively, (i) perform a bit extraction operation to extract a current most significant bit (MSB) x' of ciphertext x, (ii) calculate accuracy parameters $\alpha$, $\beta$ associated with x', (iii) apply a step function to the extracted MSB x', based, at least in part, on the calculated accuracy parameters $\alpha$, $\beta$, to reduce or remove the accumulated computational error e and to return a clean MSB b, and (iv) repeat steps (i)-(iii) for all bits included in the underlying number m; and reconstruct and outputting, from all of the returned clean MSBs b, the number m.

In some embodiments, the number m is (i) an integer, or (ii) a fixed point element.

In some embodiments, the accumulated computational error e of ciphertext x represents the result of one of: (i) one computational operation in the approximated FHE scheme, or (ii) two or more computational operations in the approximated FHE scheme.

In some embodiments, the program instructions are further executable to apply, and the method further comprises applying, after each of the two or more computational operations, a heuristic analysis to determine a size of the accumulated computational error e; and the program instructions are further executable to perform, and the method further comprises to performing, iterative steps (i)-(iv) when the accumulated computational error e exceeds a predetermined threshold value.

In some embodiments, the step function is a polynomial which provides a branch functionality.

In some embodiments, the accuracy parameter $\alpha$ defines an available accuracy of an input to the step function, and the accuracy parameters $\beta$ defines a required accuracy of an output of the step function.

In some embodiments, the ciphertext x represents one of a set of index values associated with a plurality of entries in a lookup table, wherein step (iii) applies a function which returns 1 when the ciphertext x is equal to one of the index values, and returns 0 otherwise.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
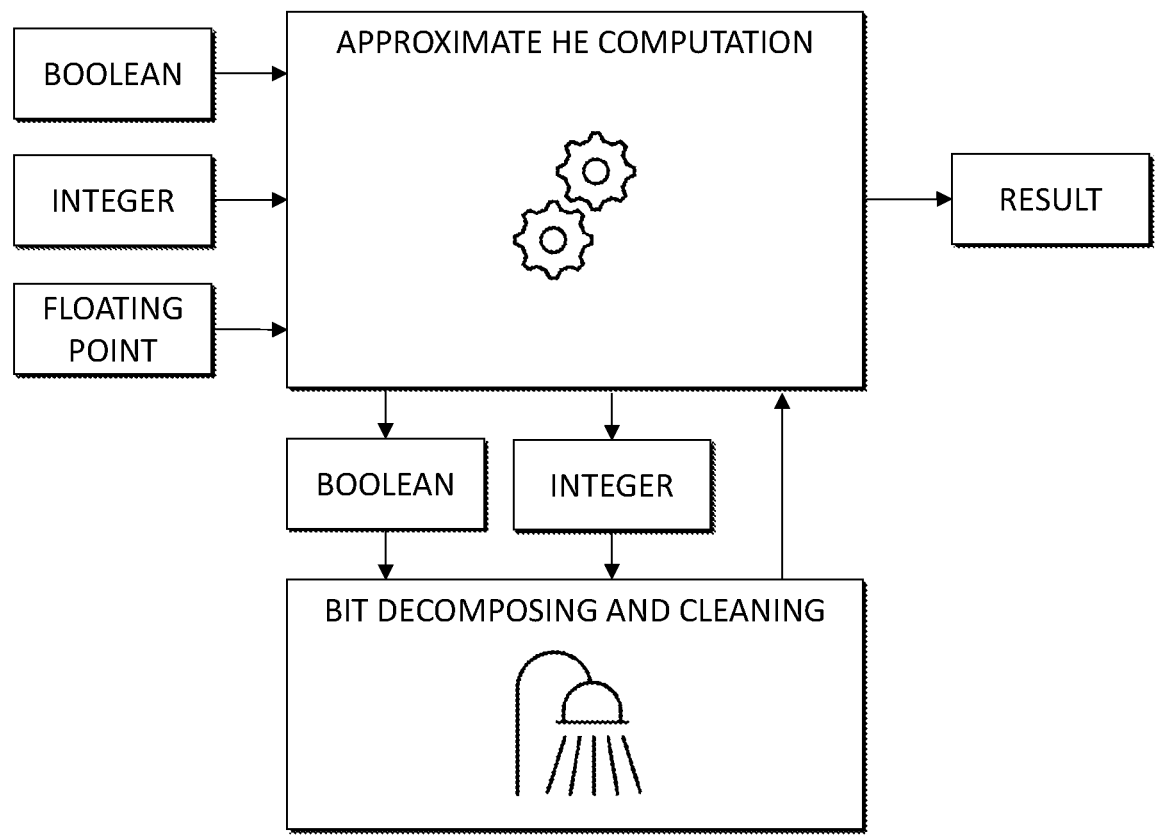
FIG. 1A schematically shows the principle of operation of a technique for error removal or reduction in ciphertexts within approximated FHE schemes.

Disclosed herein is a technique, embodied as a system, computer-implemented method, and computer program product, for implementing homomorphic encryption schemes for approximate fully-homomorphic encryption (FHE) schemes, such as CKKS. In some embodiments, the present technique provides for reducing an error accumulated in ciphertexts that are computation results of approximated FHE schemes, when the underlying plaintexts comprise a discrete set of elements, e.g., binary or integer numbers. In some embodiments, the present technique provides for error removal or reduction in ciphertexts within approximated FHE schemes, by decomposing an input ciphertext of an integer number into a binary representation, reducing the error of its binary coefficients using a suitable step function, and reconstructing the ciphertext from its binary representation, to obtain a ciphertext that encrypts the original input integer with removed or reduced error.

The present disclosure will discuss extensively, for exemplary purposes, the use of the present technique within the context of CKKS (sec, Cheon, J., et al.: Homomorphic Encryption for Arithmetic of Approximate Numbers. In: Proceedings of Advances in Cryptology—ASIACRYPT 2017. pp. 409-437. Springer Cham (November 2017)). However, the present technique is not limited to CKKS, and may be equally applicable within the context of any other approximated FHE scheme.

As noted above, in the context of approximated FHE schemes, such as CKKS, most steps of the homomorphic computations incur some small error that is added to the computation result. The accumulated error may ultimately prevent the computation results from being properly decrypted, even in an approximate way. For example, CKKS may encrypt a value m by multiplying it with a scale $\Delta$, and adds noise e. Thus, for m=126.54, the encrypted result may be 12654000000034. At every subsequent operation, such as multiplication, addition, bootstrapping, or rotation, the error increases, and the encrypted number may be rendered progressively as 12654000000134, 12654000004334, 12654000635434, etc.

Certain approximated FHE schemes require costly bootstrapping operations to deal with the accumulated error resulting from the encrypted computations or the use of non-polynomial functions approximation. Bootstrapping typically performs decryption of ciphertexts under FHE, thereby cleaning the accumulated error of a ciphertext during the circuit evaluation. In the context of CKKS, the goal of bootstrapping is typically not to remove the accumulated error (which originates in the basic CKKS operations, including the Bootstrapping itself, and from polynomial approximation errors). Instead, the bootstrapping in CKKS only increases the modulus chain, which allows performing further computations on ciphertexts. In practice, this may actually increase the noise, and therefore work to limit the potential use of CKKS to only support circuits with limited depth. Due to the potential noise growth when considering deep circuits, CKKS cannot always be treated as a true FHE scheme, because the accumulated noise makes the computation results unusable.

In some embodiments, the present technique provides for reducing the error accumulated inside ciphertexts of approximated FHE schemes, when the underlying plaintexts comprise a discrete set of elements, e.g., binary or integer numbers. An approximated FHE scheme, such as CKKS, receives, as input, Boolean, integer, and floating point elements. During the encrypted computations, the present technique provides for a cleaning operation which reduces the error of the computations, which results from the scheme itself or from polynomial approximations. Subsequently, the cleaned ciphertexts can be used in subsequent encrypted computations. Using the present technique, the error is accumulated only in floating-point elements similar to mixed integer-floating point computations on standard CPUs. FIG. 1A schematically shows the principle of operation of the present technique. As can be seen, boolean and integer elements are cleaned during the computation and thus allow deeper circuits or even unbounded circuits when only discrete set elements are involved. In some embodiments, the efficiency of the present technique in performing these computations, as measured in latency, amortized latency, or throughput, is at least comparable to equivalent solutions using other FHE schemes.

Figure 1B:
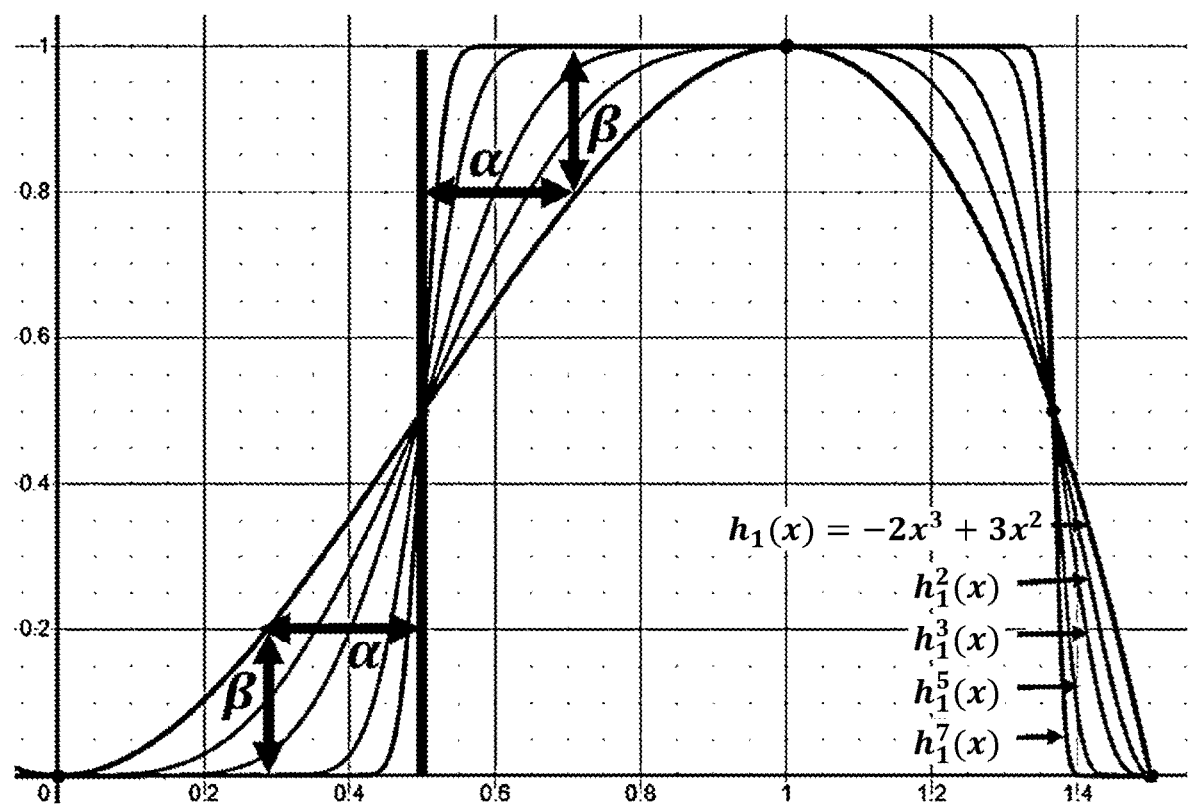
FIG. 1B shows an exemplary step function generated in accordance with the technique.

Accordingly, in some embodiments, the present technique uses suitable step functions for error removal or reduction. In some embodiments, step functions employed by the present technique are configured to return 0 or 1 depending on the conditional input, wherein an accuracy of the step functions depends on two input parameters which represent the available input precision $\alpha$ and the required output precision $\beta$. For example, a ciphertext may encrypt the plaintext value 1.0003245, which corresponds to the binary value 1. The goal of the step function is then to remove the most significant digits after the decimal point, so as to map values that are close to 0,1 within a margin of accuracy, to the actual values 0,1. FIG. 1B uses the exemplary function $$h_1(x) = -2x^3 + 3x^2$$

for $x \in [-0.2, 1.2]$, to demonstrate how a step function can be generated. It presents different "step" function approximations achieved through using a different number of compositions of the function $h_1(x) = -2x^3 + 3x^2$ over the input range $[-0.2, 1.2]$. The vertical line at 0.5 represent the middle point between the two step values 0 and 1, and $\alpha$ is the distance of the input from that line to the curve for a given output accuracy $\beta$. As the number of compositions increases, the multiplication depth increases and the accuracy parameters $\alpha$, $\beta$ decrease.

A potential advantage of the present technique is, therefore, in that is provides for quick and efficient execution of unbounded binary or integer circuits over approximated FHE schemes (such as CKKS), which renders approximated FHE schemes as a viable alternative for performing binary circuits.

Figure 2:
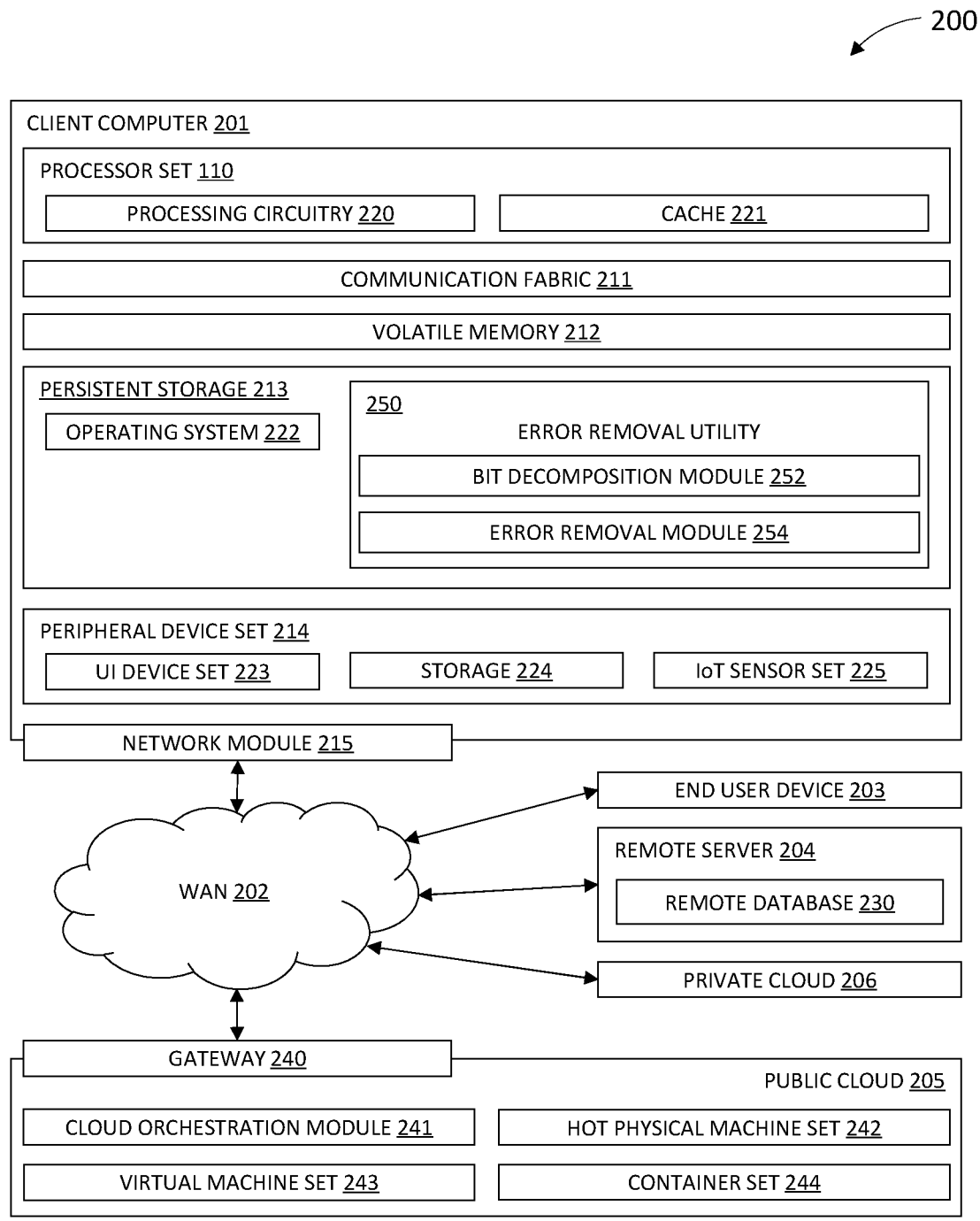
FIG. 2 shows a block diagram of an exemplary computing environment for the execution of at least some of the computer code involved in performing the inventive methods of the present disclosure.

Reference is now made to FIG. 2, which shows a block diagram of an exemplary computing environment 200, containing an example of an environment for the execution of at least some of the computer code involved in performing the inventive methods, such as an error removal utility 250, comprising, e.g., a bit decomposition module 252, and an error removal module 254. In addition to error removal utility 250, computing environment 200 includes, for example, a computer 201, a wide area network (WAN) 202, an end user device (EUD) 203, a remote server 204, a public cloud 205, and/or a private cloud 206. In this example, computer 201 includes a processor set 210 (including processing circuitry 220 and a cache 221), a communication fabric 211, a volatile memory 212, a persistent storage 213 (including an operating system 222 and error removal utility 250, as identified above), a peripheral device set 214 (including a user interface (UI), a device set 223, a storage 224, and an Internet of Things (IoT) sensor set 225), and a network module 215. Remote server 204 includes a remote database 230. Public cloud 205 includes a gateway 240, a cloud orchestration module 241, a host physical machine set 242, a virtual machine set 243, and a container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one or more computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in error removal utility 250 or in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read-only memory (ROM), but typically at least a portion of the persistent storage allows writing of data, deletion of data and re-writing of data. Some familiar forms of persistent storage include magnetic disks and solid-state storage devices. Operating system 222 may take several forms, such as various known proprietary operating systems or open source Portable Operating System Interface type operating systems that employ a kernel. The code included in error removal utility 250 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as a network interface controller (NIC), a modem, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through the hardware included in network module 215.

WAN 202 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
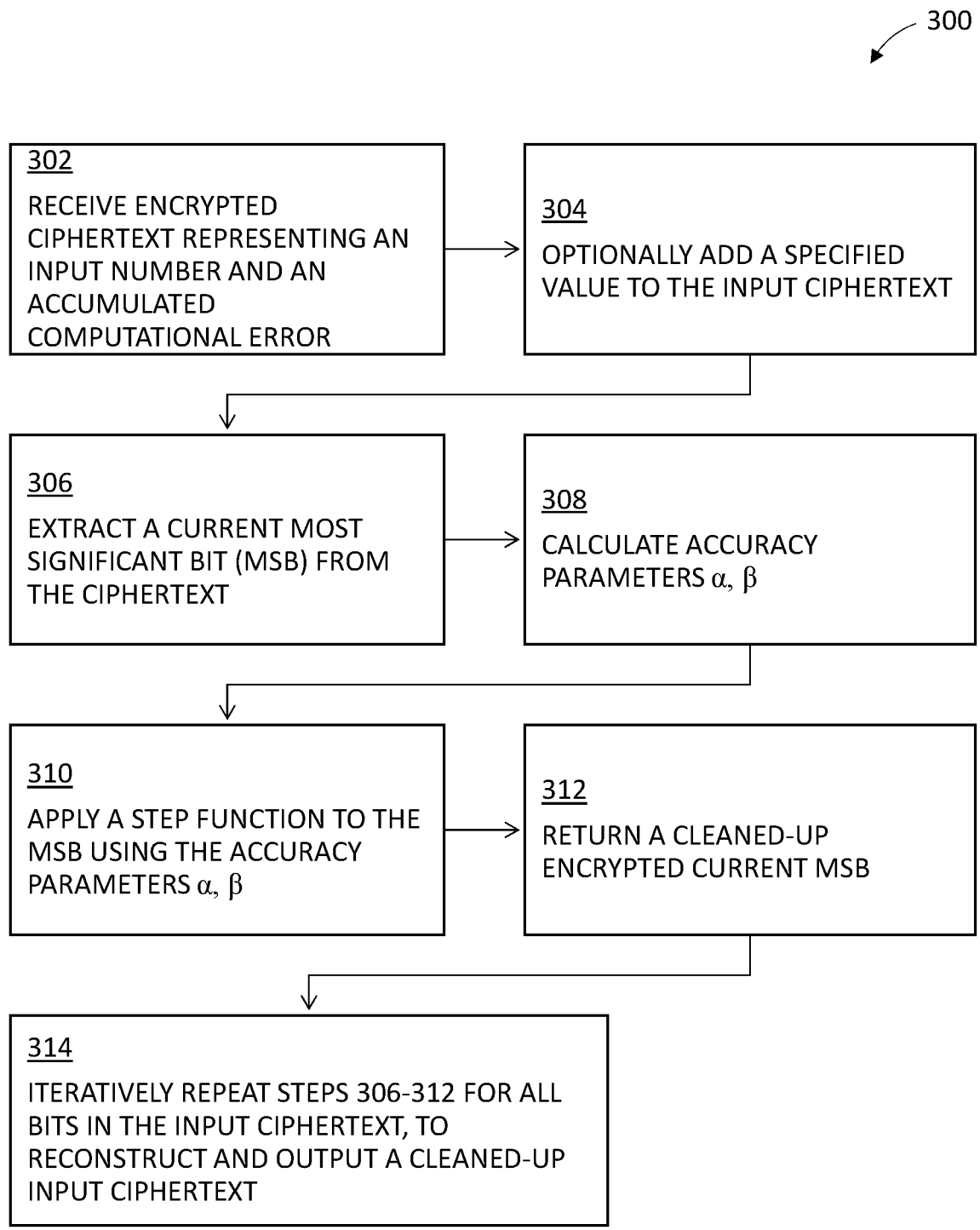
FIG. 3 is a flowchart of the functional steps in a method for error removal or reduction in ciphertexts within approximated FHE schemes.

The instructions of error removal utility 250 will now be discussed with reference to the flowchart of FIG. 3, which illustrates a method 300 for error removal or reduction in ciphertexts within approximated FHE schemes, such as CKKS, by decomposing an input ciphertext of an integer into a binary representation, reducing the error of its binary coefficients, and reconstructing the ciphertext from its binary representation, to obtain a ciphertext that encrypts the original integer with removed or reduced error. The steps of method 300 will be discussed with continued reference to error removal utility 250 shown in FIG. 2.

The various steps of method 300 may either be performed in the order they are presented or in a different order (or even in parallel), as long as the order allows for a necessary input to a certain step to be obtained from an output of an earlier step. In addition, the steps of method 300 may be performed automatically (e.g., by error removal utility 250 of FIG. 2), unless specifically stated otherwise.

In an overview, method 300 provides for an iterative bit-decomposition and cleanup algorithm (which may comprise a most significant bit extraction sub-algorithm), which receives an encrypted ciphertext x (which represents an input number and some accumulated computational error e added thereto), and decomposes x to its component bits by iteratively extracting the most significant bit (MSB) at each iteration. Method 300 then applies a step function to each decomposed bit which returns 0 or 1, depending on the conditional input. Method 300 then reconstruct input ciphertext x from the decomposed and cleaned-up bits, to obtain a cleaned-up ciphertext x.

In some embodiments, the one or more step functions employed by method 300 are used as polynomials that approximately provide a branch functionality:

$$Step_\alpha(x) = \begin{cases} 0 & 0 \le x < 0.5 - \frac{\alpha}{2} \\ 1 & 0.5 + \frac{\alpha}{2} < x \le 1 \\ \infty & \text{otherwise} \end{cases},$$

defined for $x \in [0,1]$. The equivalent sign function may provide similar functionality:

$$Sign_\alpha(x) = \begin{cases} 0 & -1 \le x < -\alpha \\ 1 & \alpha < x \le 1 \\ \infty & \text{otherwise} \end{cases}.$$

Is should be noted that the step and sign functions are equivalent because $$_\alpha(x) = 2_\alpha\left(\frac{x+1}{2}\right) - 1 \text{ for } x \in [-1, 1],$$

and thus may be used interchangeably.

The polynomial approximation for these functions may use an additional parameter $\beta$. Let $Step_{\alpha,\beta}$ be denoted such that $|Step_{\alpha,\beta}(x) - Step_\alpha(x)| < \beta/2$. Using step functions, it is possible to simulate branches and implement comparison functions, as well as other primitives. The size and depth of the function $Step_{\alpha,\beta}$ is denoted by $S(\alpha, \beta)$ and $D(\alpha, \beta)$, respectively. It then may be shown that there exists an efficient step function $$Step_{\alpha,\beta}(x)$$

that for $\alpha < |x| \le 1$ returns y, such that $|y - Step(x)| < \beta$, and for which $S(\alpha, \beta) = D(\alpha, \beta) = +\mathcal{O}(\log(1/\alpha)) + \mathcal{O}(\log \log(1/\beta))$. In some embodiments, method 300 may use any step function which adheres to this criteria.

An exemplary step function used by method 300 may be represented as $f_1(x) = -0.5x^3 + 1.5x$ for $x \in [-1,1]$, which is equivalent to the step function $h_1(x) = -2x^3 + 3x^2$ for $x \in [0,1]$, shin in FIG. 1B. Another exemplary step function which may be used by method 300 may be represented as $Step^1(x) = f_3^3(g_3^8(x))$.

Accordingly, in some embodiments method 300 represents an iterative process which comprises the following steps:
(i) Receiving an encrypted input number x, wherein $x \in \mathbb{N}$ and $x < 2^{N+1}$ for some predefined N representing the number of digits in x, and x includes an accumulated error e, for which $e \in \mathbb{R}$ is a small number $|e| < 0.5 - \alpha$;
(ii) extracting a current most significant bit (MSB) of x;
(iii) applying a step function to clean the extracted MSB, based on calculated accuracy parameters $\alpha$, $\beta$;
(iv) returning an encrypted MSB b which is a 'cleaned' $\beta$ approximation of $(x)_N$, i.e., $|b - xN| < \beta$;
(v) repeating steps (ii)-(iv) for a next MSB of x; and
(vi) reconstructing a cleaned up input number x from all of the cleaned-up bits b.

With reference back to FIG. 3, method 300 begins in step 302, wherein error removal utility 250 receives, as input, an encrypted ciphertext x which represents some accumulated computational error e added to x, such that $e \in \mathbb{R}$ is a small number $|e| < 0.5 - \alpha$. In some embodiments, x represents a computation result originating from an approximated FHE scheme, such as CKKS. In some embodiments, the error e represents an accumulated error accrued over a single one, or optionally a sequence of two or more, computations performed by the approximated FHE scheme.

In some embodiments, input ciphertext x represents an integer or a fixed-point element (i.e., a number represented with a fixed number of digits of its fractional part). In some embodiments, it is assumed that $x \in \mathbb{N}$ and $x < 2^{N+1}$ for some predefined N representing the total number of digits in x.

In optional step 304, the instructions of bit decomposition module 252 may cause error removal utility 250 to add a specified value to input number x, e.g., 0.5.

In step 306, the instructions of bit decomposition module 252 may cause error removal utility 250 to extract a current most significant bit (MSB) x' from input number x, such that:

$$x' = \left[(x + e + 0.5)/2^N\right] - 1.$$

where $N \in \mathbb{N}$ represents the number of digits in x.

In step 308, the instructions of error removal module 254 may cause error removal utility 250 to calculate accuracy parameters $\alpha'$, $\beta'$ associated with MSB x' as follows:

$$\alpha' = \frac{\alpha}{2^N},$$

$$\beta' = 2(\beta - e_{ckks}).$$

In some embodiments, accuracy parameters $\alpha'$, $\beta'$ define the accuracy of the step function used in subsequent step 310 to clean the extracted MSB x'. In some embodiments, $e_{ckks} \in \mathbb{R}_{\ge 0}$, where $e_{ckks}$ defines the upper bound on the cumulative error that may be added during execution.

In step 310, the instructions of error removal module 254 may cause error removal utility 250 to apply a step function to the extracted current MSB x' as follows, to obtain a cleaned up MSB b' represented as 1 or 0:

$$b' = Step_{\alpha',\beta'}(x').$$

In some embodiments, the step function employed by error removal utility 250 may be represented as:

$$b' = \text{Step}_{\left(\alpha' = \frac{0.5}{2^N}, \beta'\right)}\left(\frac{x'}{a} - 1\right).$$

However, any number of suitable step functions may be employed, e.g., any efficient step function $\text{Step}_{\alpha,\beta}(x)$ which for $\alpha \le |x| \le 1$ returns y, such that $|y-\text{Step}(x)| < \beta$, and for which $S(\alpha, \beta) = D(\alpha, \beta) = \mathcal{O}(\log(1/\alpha)) + \mathcal{O}(\log \log(1/\beta))$.

In step 312, the instructions of error removal module 254 may cause error removal utility 250 to return an encrypted bit b which is a $\beta'$ approximation of current MSB x':

$$b = (b' + 1)/2.$$

In step 314, the instructions of error removal module 254 may cause error removal utility 250 to repeat steps 306-312 iteratively, for all bits in input number x, to obtain a series of cleaned up bits for i=N, . . . , 0. The instructions of error removal module 254 may then cause error removal utility 250 to reconstruct and output a cleaned up input number x recomposed from the series cleaned-up bits obtained in step 314.

In some embodiments, method 300 may iterate over ciphertexts after every computation operation of an approximated FHE scheme, such as CKKS. However, in some applications, method 300 may iterate steps 306-312 over two or more consecutive computation operations, once it is determined that a sufficient amount of error has accumulated. This implementation may be practicable in the case of operations where the accumulated noise is trackable or in the case of non-polynomial functions (e.g. ReLU, min, etc.) which provide a guarantee of the accuracy of their output. In some cases, the number of operations between clean-up iterations can be determined based, e.g., on heuristic simulations or on theoretical analysis of the error by using e.g., a worst case analysis or a Central Limit Theorem (CLT)-based analysis.

In some embodiments, an exemplary MSB extraction sub-algorithm which may be applied by error removal utility 250 may be represented as Algorithm 1 below:

---
Algorithm 1:

Parameters: $N \in \mathbb{N}$, $\alpha$, $\beta$, $e_{ckks} \in \mathbb{R} \ge 0$.
Input: Ciphertext x + e, where $x \in \mathbb{N}$, $x < 2^{N+1}$, and $|e| < 0.5 - \alpha$.
Output: Ciphertext b.
1:     procedure $\text{Extract}_{N,\alpha,\beta,e_{ckks}}$ (x + e)
3:     $x' = \left[\dfrac{x+e+0.5}{2^N}\right] - 1$
4:     $\alpha' = \dfrac{\alpha}{2^N}$
4:     $\beta' = 2(\beta - e_{ckks})$
5:     $b' = \text{Step}_{\alpha',\beta'}(x')$
6:     $b = \dfrac{b'+1}{2}$
7:     return b
8:     end procedure

---

The following Lemma 1 considers the correctness and complexity of exemplary MSB extraction sub-algorithm Algorithm 1:

Lemma 1: Let $\alpha$, x, e, N be input parameters 1, then $$\frac{\alpha}{2^N} < \left|\frac{x+e+0.5}{2^N} - 1\right| < 1.$$

Proof: Denote $x_{fl} = x + e + 0.5$ and $$x' = \frac{x_{fl}}{2^N} - 1.$$

From the input parameters, there is obtained $|e| < 0.5 - \alpha$, therefore:

$$x - 0.5 + \alpha < x + e < x + 0.5 - \alpha \tag{1}$$

and $$x < x + \alpha < x_{fl} < x + 1 - \alpha < x + 1. \tag{2}$$

When $0 \le x < 2^{N+1}$, two separate cases must be considered:

Case 1:

$$0 \le x < 2^N$$
$$0 < x_{fl} < 2^N - \alpha$$
$$-1 < x' < -\frac{\alpha}{2^N}$$

Case 2:

$$2^N \le x < 2^{N+1}$$
$$2^N + \alpha < x_{fl} < 2^{N+1}$$
$$\frac{\alpha}{2^N} < x' < 1$$

where in both cases, $$\frac{\alpha}{2N} < |x'| < 1$$

as required.

The following Theorem 1 uses Lemma 1.

Theorem 1: Let $\alpha$, $\beta$, x, e, N, $e_{ckks}$ be input parameters as in Algorithm 1, then:

1. Algorithm 1 is correct, i.e., it outputs b, where $|b - x_N| < \beta$

2. Algorithm 1 requires a circuit of size $$O\left(S\left(\frac{\alpha}{2^N}, 2\beta\right)\right)$$

and depth $$O\left(D\left(\frac{\alpha}{2^N}, 2\beta\right)\right).$$

Proof:
1. Let $$x' = \frac{x+e+0.5}{2^N} - 1, \alpha' = \frac{\alpha}{2^N} \text{ and } \beta' = 2(\beta - e_{ckks})$$

as in Algorithm. From Lemma, it is known that $\alpha' < |x'| < 1$, such that by Theorem 1, when b'=Step$_{\alpha',\beta'}$(x') in applied, there is obtained $|b'-xN| < \beta'$. Subsequently, because $xN \in \{-1,1\}$, there is obtained b'=(2xN−1)+$e_1$, where $$|e_1| < \beta', \text{ i.e., } \frac{|e_1|}{2} + e_{ckks} < \beta.$$

It follows that b=xN+$e_2$, where $$|e_2| \le \left|\frac{e_1}{2} + e_{ckks}\right| \le \frac{|e_1|}{2} + e_{ckks} \le \beta.$$

2. This follows from Theorem 1, because Algorithm 1 performs exactly one call to $$\text{Step}_{\frac{\alpha}{2^N}, 2\beta}$$

together with a fixed number of plaintext-ciphertext multiplications.

In some embodiments, an exemplary iterative bit decomposition algorithm which may be applied by error removal utility 250 may be represented as Algorithm 2 below. Algorithm 2 receives an input x+e, where $x \in$ and $|e| < 0.5 - \alpha$. Algorithm 2 uses MSB extraction sub-algorithm presented in Algorithm 1 iteratively, to find the MSB and remove it from the input x. Attention should be given to the parameters of Algorithm 1. In some cases, accuracy parameters $\alpha$ and/or $\beta$ may need to be adjusted for each iteration, to account for the error coming from subtracting approximated bits in previous iterations.

| Algorithm 2: |
| --- |
| Parameters: $N \in \mathbb{N}$, $\alpha$, $\beta$, $e_{ckks} \in \mathbb{R}_{\ge 0}$.<br>Input: Ciphertext x + e, where $x \in \mathbb{N}$, $x < 2^{N+1}$, and $|e| < 0.5 - \alpha$.<br>Output: A vector $(b_i)_{0 \le i < N}$ of the N + 1 bits of x s.t. $|b_i - xi| < \beta_i$.<br>1:    procedure Decompose$_{N,\alpha,\beta_N,\ldots,\beta_0}$ (x + e)<br>2:        $y_N$ = x<br>3:        For i = N,...,0 do<br>4:            $\alpha_i = \alpha \cdot 2^{i-N}$<br>5:            $\beta_i = \min(\beta, \alpha \cdot 2^{i-N})$<br>6:            $b_i$ = Algorithm $1_{i,\alpha_i,\beta_i,e_{ckks}}(y_i)$<br>7:            $y_i - 1 = Y_i - 2^i \cdot b_i$<br>8:        end for<br>9:    return $(b_i)_{0 \le i \le N}$<br>10:  end procedure |

The following Lemma 2 considers the correctness and complexity of exemplary Algorithm 2:

Lemma 2: Let N, $\alpha$, $\beta_N$, ..., $\beta_0$, x, e be parameters as in Algorithm 2()@ and $y_0$, ... $y_N$ as defined by Algorithm 2()@ Lines 2()@ and 2()@. Then $|y_i-(x \bmod 2^{i+1})| < 0.5 - \alpha 2^{i-N}$, for $0 \le i \le N$.

Proof: Starting from the first iteration (i=N) and going to the Nth iteration (i=0), the case i=N follows immediately from the assumptions on the input:

$$|y_N - x| = |x + e - x| = |e| < 0.5 - \alpha \cdot 2^{N-N} = 0.5 - \alpha. \quad (3)$$

Assuming it holds that $$|y_i - (x \bmod 2^{i+1})| < 0.5 - \alpha \cdot 2^{i-N}, \quad (4)$$

then it can be proven that $$|y_{i-1} - (x \bmod 2^i)| < 0.5 - \alpha \cdot 2^{i-1-N}. \quad (5)$$

Starting from $$|y_{i-1} - (x \bmod 2^{i-1})| = |y_{i-1} - y_i + y_i - (x \bmod 2^{i-1}) + (x \bmod 2^i) - \quad (6)$$
$$(x \bmod 2^i)| \le |y_{i-1} - y_i + (x \bmod 2^i) - (x \bmod 2^{i-1})| +$$
$$|y_i - (x \bmod 2^i)| < |y_{i-1} - y_i + (x \bmod 2^i) - (x \bmod 2^{i-1})| +$$
$$0.5 - \alpha \cdot 2^{i-N},$$

where the last inequality follows from the induction assumption by Eq. (4). By construction, there is obtained $y_{i-1} - y_i = 2^i \cdot b_i$, where $b_i$ is a ciphertext, and multiplying by $2^i$ does not add noise because it can be implemented by i additions of elements with low error. Because $(x \bmod 2^i) - (x \bmod 2^{i-1}) = 2^i \cdot xi$, there is obtained $$Eq.(6) \le |2^i \cdot (b_i - xi)| + 0.5 - \alpha \cdot 2^{i-N} \quad (7)$$

by construction:

$$|b_i - xi| \le \beta_i \le \alpha 2^{-N-1} \quad (8)$$

and thus $$Eq.(7) \le 2^i \cdot \alpha \cdot 2^{-N-1} + 0.5 - \alpha \cdot 2^{i-N} \quad (9)$$
$$= 0.5 - \alpha(2^{i-N} - 2^{i-N-1}) = 0.5 - \alpha 2^{i-N-1}. \quad (10)$$

as required.
The following Theorem 2 uses Lemma 2.
Theorem 2: Let N, $\alpha$, $\beta$, e be parameters as in Algorithm 2, then:
1. Algorithm 2 outputs $(b_i)_{0 \le i < N}$, s.t. $|b_i - xi| < \beta_i$.
2. Algorithm. 2 requires a circuit of size $O(\Sigma S(\alpha \cdot 2^{i-N}, \min(\beta, \alpha \cdot 2^{i-N})))$ and depth $O(\Sigma D(\alpha \cdot 2^{i-N}, \min(\beta, \alpha \cdot 2^{i-N})))$, where $S(\alpha, \beta)$ and $D(\alpha, \beta)$ are the size and depth of the circuits implementing the sign function with parameters $\alpha$ and $\beta$.

Proof:
1. The $i^{th}$ bit $b_i$ is computed in Line 6 of Algorithm 2 by calling Algorithm 1, Algorithm $1_{i,\alpha_i,\beta_i,e_{ckks}}(y_i)$. From Lemma 2, $|y_i - x| < \alpha_i$ and $2^{i+1} > y_i \in$ as required from the parameters and input of Algorithm 1.

2. Algorithm 2 involves N calls to Algorithm 1 with a total circuit size of $O(\Sigma S(\alpha \cdot 2^{i-N}, \min(\beta, \alpha \cdot 2^{i-N})))$ and circuit depth $O(\Sigma D(\alpha \cdot 2^{i-N}, \min(\beta, \alpha \cdot 2^{i-N})))$, where $S(\alpha, \beta)$ and $D(\alpha, \beta)$ are the size and depth of the circuits implementing the sign function with parameters $\alpha$ and $\beta$.

In some embodiments, the present technique provides for an exemplary Algorithm 3 configured for clean-up of integer input numbers. The input is a message $m_{in}=x+e$, where $x \in \mathbb{N}$, $x<2^N$ and $|e|<0.5-\alpha$ for some $N \in \mathbb{N}$ and the output is $m_{out}$, which is a cleaner version of $m_{in}$, $|m_{out}-x|<\beta<\alpha$, for parameters $\alpha, \beta \in \mathbb{R}_{\geq 0}$. Algorithm 3 calls exemplary Algorithm 2 presented above, to extract the bit decomposition $(b_i)_{0 \leq i < N}$ of x, and re-compose the cleaned integer.

In some embodiments, Algorithm 3 involves N+1 calls to MSB extraction sub-algorithm Algorithm 1 with a total circuit size of $O(\Sigma S(\alpha \cdot 2^{i-N}, \min(\beta \cdot 2^{-N-1}, \alpha \cdot 2^{i-N})))$ and circuit depth $O(\Sigma D(\alpha \cdot 2^{i-N}, \min(\beta \cdot 2^{-N-1}, \alpha \cdot 2^{i-N})))$, where $S(\alpha, \beta)$ and $D(\alpha, \beta)$ are the size and depth of the circuits implementing the sign function with parameters $\alpha$ and $\beta$.

| Algorithm 3: |
|---|
| Parameters: $N \in \mathbb{N}$, $\alpha, \beta, e_{ckks} \in \mathbb{R}_{\geq 0}$. <br> Input: Ciphertext $x + e$, where $x \in \mathbb{N}$, $x < 2^{N+1}$, and $|e| < 0.5 - \alpha$. <br> Output: Ciphertext y such that $|y - x| < \beta$. <br> 1:   procedure CleanInteger$_{N,\alpha,\beta}(x + e)$ <br> 2:     $\beta' = 2^{-N-1} \cdot \beta$ <br> 3:     $(b_i)_{0 \leq i \leq N}$ = algorithm $2_{N,\alpha,\beta',e_{ckks}}$ <br> 4:     $y \Sigma b_i \cdot 2^i$ <br> 5:     For $i = N,\ldots,0$ do <br> 9:     return y <br> 10:  end procedure |

The following Theorem 3 considers Algorithm 3.

Theorem 3: Let $N$, $\alpha$, $\beta$, $e_{ckks}$ be parameters as in Algorithm 3, and $x+e$ be the input where $x \in \mathbb{N}$, $x<2^{N+1}$ and $|e|<0.5-\alpha$, then 1. Algorithm 3 is correct, i.e., it outputs y such that $|y-x|<\beta$.
2. Algorithm 3 requires a circuit of size $O(\Sigma S(\alpha \cdot 2^{i-N}, \min(\beta \cdot 2^{-N-1}, \alpha \cdot 2^{i-N})))$ and depth $O(\Sigma D(\alpha \cdot 2^{i-N}, \min(\beta \cdot 2^{-N-1}, \alpha \cdot 2^{i-N})))$.

Proof:

1. Line 3 of Algorithm 3 approximately decomposes $x+e$ by calling Algorithm $2_{N,\alpha,\beta',e_{ckks}}(x+e)$, with $\beta'=2^{-N-1} \cdot \beta$ that returns $(b_i)_{0 \leq i \leq N}$. Next, in Line 4, Algorithm 3 computes $y=\Sigma 2^i b_i$, such that:

$$|y - x| = \left|\sum 2^i b_i - x\right| = \left|\sum 2^i b_i - \sum 2^i x_i\right| < \sum 2^i |b_i - x_i| \quad (11)$$

From Theorem 2, $|b_i - x_i| < \beta'$ such that $$(1) < \sum 2^i \beta' < \sum 2^i 2^{-N-1} \beta < \beta. \quad (12)$$

Theorem 4: There exists an efficient step function $\text{Step}_{\alpha, \beta}(x)$ that for $\alpha < |x| \leq 1$ returns y such that $|y - \text{Step}(x)| < \beta$ and for which $S(\alpha, \beta) = D(\alpha, \beta) = (\log(1/\alpha)) + (\log \log(1/\beta))$.

The following are Corollaries 1-3:

Corollary 1: Let $N \in$, $\alpha, \beta \in_{\geq 0}$ be parameters as in Algorithm??, then Algorithm?? requires a circuit of size $$O\left(N \cdot \log\left(\frac{1}{\alpha}\right) + N^2 + N \cdot \log\left(\log\left(\frac{1}{\beta}\right)\right)\right)$$

and depth $$O\left(N \cdot \log\left(\frac{1}{\alpha}\right) + N^2 + N \cdot \log\left(\log\left(\frac{1}{\beta}\right)\right)\right).$$

Proof: Using Theorem 4 above, there can be achieved a step function of parameters $\alpha, \beta$ by circuits of size and depth $O(-\log(\alpha)+\log(-\log(\beta)))$. Using this, with Theorem 3 above, there can be obtained that the size and depth of the circuit required by Algorithm 3 are $$O\left(\sum -\log\left(\alpha \cdot 2^{i-N}\right) + \log\left(-\log\left(\min\left(\beta, \alpha \cdot 2^{i-N}\right)\right)\right)\right) =$$

$$O\left(\sum -\log\left(\alpha \cdot 2^{i-N}\right) + \log\left(-\log\left(\beta\right)\right)\right) = O\left(\sum -\log\left(\alpha \cdot 2^{i-N}\right) + \log\left(-\log\left(\beta\right)\right)\right) = O\left(\sum\left(-\log\left(\alpha\right) - i + N + \log\left(\log\left(\frac{1}{\beta}\right)\right)\right)\right) =$$

$$O\left(N \cdot \log\left(\frac{1}{\alpha}\right) + N^2 + N \cdot \log\left(\log\left(\frac{1}{\beta}\right)\right)\right)$$

Corollary 2: Let $N \in$, and $\alpha, \beta \in_{\geq 0}$ be parameters as in Algorithm 3, then Algorithm 3 requires a circuit of size $$O\left(N \cdot \log\left(\frac{1}{\alpha}\right) + N^2 + N \cdot \log\left(N + 1 + \log\left(\frac{1}{\beta}\right)\right)\right)$$

and depth $$O\left(N \cdot \log\left(\frac{1}{\alpha}\right) + N^2 + N \cdot \log\left(N + 1 + \log\left(\frac{1}{\beta}\right)\right)\right).$$

Proof: Using Theorem 4 above, there can be achieved a step function $\text{Step}_{\alpha,\beta}$ by circuits of size and depth $O(-\log(\alpha)+\log(-\log(\beta)))$. Plugging it in Theorem 4 and denoting $\gamma = \Sigma -\log(\alpha \cdot 2^{i-N})$, there can be obtained that the size and depth of Algorithm 3 circuit are $$O(\gamma) + \log\left(-\log\left(\min\left(\beta \cdot 2^{-N-1}, \alpha \cdot 2^{i-N}\right)\right)\right) =$$

$$O(\gamma + \log\left(-\log\left(\beta \cdot 2^{-N-1}\right)\right)) =$$

$$O\left(\sum\left(-\log\left(\alpha\right) - i + N + \log\left(N + 1 + \log\left(\frac{1}{\beta}\right)\right)\right)\right) =$$

$$O\left(N \cdot \log\left(\frac{1}{\alpha}\right) + N^2 + N \cdot \log\left(N + 1 + \log\left(\frac{1}{\beta}\right)\right)\right)$$

Corollary 3: Let Algorithm 3 for parameters $\alpha, \beta$ use $\text{Step}_{\alpha',\beta'} = f_3$, and let the error B generated by $\text{Step}_{\alpha',\beta'}$ be less than 0.027855. Then, Algorithm 3 is correct if 1. $\alpha \cdot 2^{-N} < 2.066B$.
2. $\min\left(\beta \cdot 2^{-N-1}, \alpha \cdot 2^{-N}\right) > 9B$.

Proof: Let $\alpha'_i, \beta'_i$ be as defined in Algorithm 3 Lines 3 and 4, respectively, during the ith iteration. Setting n=3 in Theorem 2 leads to $$c_3 = \frac{35}{16}, B < 0.0279$$

(for appropriate choice of the parameters of the key) and effective bounds on $\alpha'_i, \beta'_i$. These bounds are now tied to $\alpha$, and $\beta$. From Theorem 1, $$\max_i \alpha'_i = \alpha \cdot 2^{-N} < \left(\frac{c_3}{c_3 - 1}\right)^{c_3 - 1} B \approx 2.066 B.$$

In addition, $$\max_i \beta'_i = -\log\left(\min\left(\beta \cdot 2^{-N-1}, \alpha \cdot 2^{i-N}\right)\right) < \log\left(\frac{1}{B}\right) - \log(9) = \log(1/9B).$$

In some embodiments, the present technique can be used to implement the modulo operation on a noisy integer m=x+e, for $x \in \mathbb{N}$, $x<2^{N+1}$ and $e \in \mathbb{R}$, i.e., compute y=x mod n for $n \in \mathbb{N}$. This leads to computation over $\mathbb{Z}_n$ natively in CKKS. This can be done by following these steps (we leave out the exact details):

Set $$v = \frac{x}{n} - \frac{n-1}{2n},$$

$$w = \left\lfloor \frac{x}{n} \right\rfloor$$

is computed by $$w = \text{Algorithm } 3_{N, \frac{1}{2n}, \frac{1}{n}}(v),$$

Compute the residue: r=x−w·n.

To sketch a proof of the correctness (to simplify, assume e=0), notice that $$\left\lfloor \frac{x}{n} \right\rfloor \le \frac{x}{n} \le \left\lfloor \frac{x}{n} \right\rfloor + \frac{n-1}{n} \quad (13)$$

and so $$\left\lfloor \frac{x}{n} \right\rfloor - \frac{1}{2} + \frac{1}{2n} = \left\lfloor \frac{x}{n} \right\rfloor - \frac{n-1}{2n} \le \frac{x}{n} - \frac{n-1}{2n} = v \quad (14)$$

and also $$v \le \left\lfloor \frac{x}{n} \right\rfloor + \frac{n-1}{n} - \frac{n-1}{2n} = \left\lfloor \frac{x}{n} \right\rfloor + \frac{1}{2} - \frac{1}{2n}. \quad (15)$$

In some embodiments, the present technique provides for table access, which may be useful when a lookup table is precomputed to speed execution. In this case, a table of n entries T[1], . . . , T[n], where for an input index x=1, . . . , n the desired output is T[x]. When x is a ciphertext this can be done by:

$$y = \sum Cmp\ (x, i) \cdot T[i],$$

where Cmp(a, b) is a function that returns 1 if a=b and 0 otherwise. The accuracy of y, i.e., |y−T[x]| depends on the accuracy of the function Cmp that needs to be more accurate (and therefore more expensive to compute) as n grows. In this naive implementation, the size of the circuit that accesses a table is $O(nS_{Cmp})$, where $S_{Cmp}$ is the size of the circuit implementing. The following steps are proposed to access a table:

Compute the bit decomposition ($b_j$) of x.

Set y=$\Sigma_i$ CmpBin($b_j$,i)·T[i], where CmpBin compares ($b_j$) to i in binary.

For large values of n, the implementation of involves a circuit whose size is smaller than that of, i.e. $S_{Bin\ Cmp} < S_{Cmp}$. The size of the circuit that accesses a table is then:

$$O(S(\text{Algorithm } 2) + n \cdot S_{Bin})),$$

where S(Algorithm 2) is the circuit size of Algorithm 2 and $S_{Bin\ Cmp}$=O(log n) is the size of the circuit that compares two n-bit numbers given in binary.

Experimental Results

Algorithm 3 detailed hereinabove describes an exemplary algorithm of the present technique for clean-up of integers, and Theorem 3 showed its correctness. It is left to argue that this method is efficient for some values of N and thus can be manifested in cryptographic libraries that implement CKKS. To this end, the present inventors designed the following experiment.

The exemplary algorithm samples 10,000 random 16-bit integers, where an error, sampled uniformly from [−0.1, +0.1] is added to every integer. The noisy integers are packed and encrypted as a single CKKS ciphertext that is fed as an input to Algorithm 3 with the parameters $\alpha$=0.1, $\beta$=$10^{-3}$, and N=16. With these parameters, the algorithm expects a 16-bit integer that contains a maximum error of |0.1|, and the expected error of the result should not exceed |$10^{-3}$|. Next, the resulting ciphertext is decrypted and the error level is evaluated by subtracting the decrypted result from the originally sampled integers.

Algorithm 3 was implemented using the step function shown in FIG. 1B, $h_1(x)=-2x^3+3x^2$ for $x \in [-0.2, 1.2]$.

Figure 4:
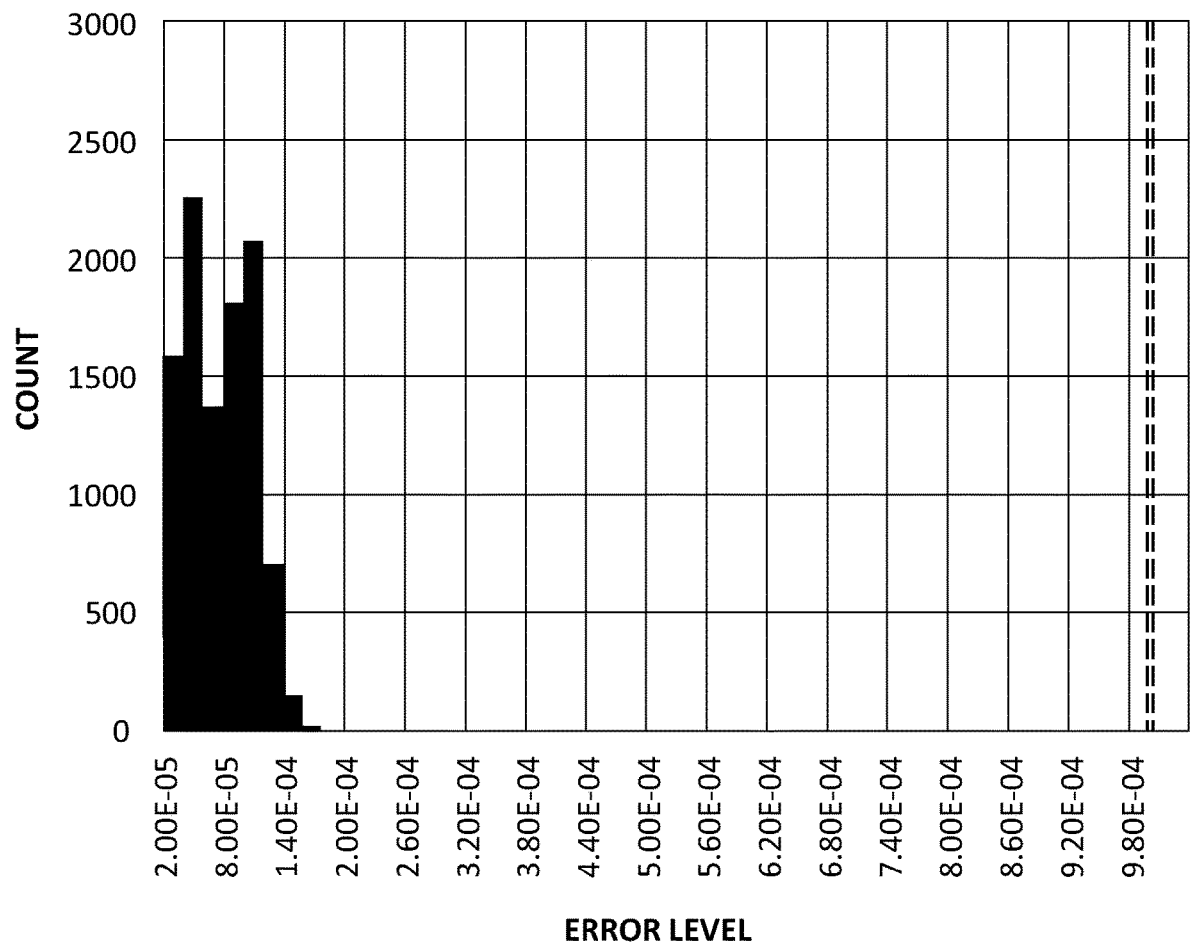
FIG. 4 shows a histogram of a measured error, according to experimental results.
Figure 5:
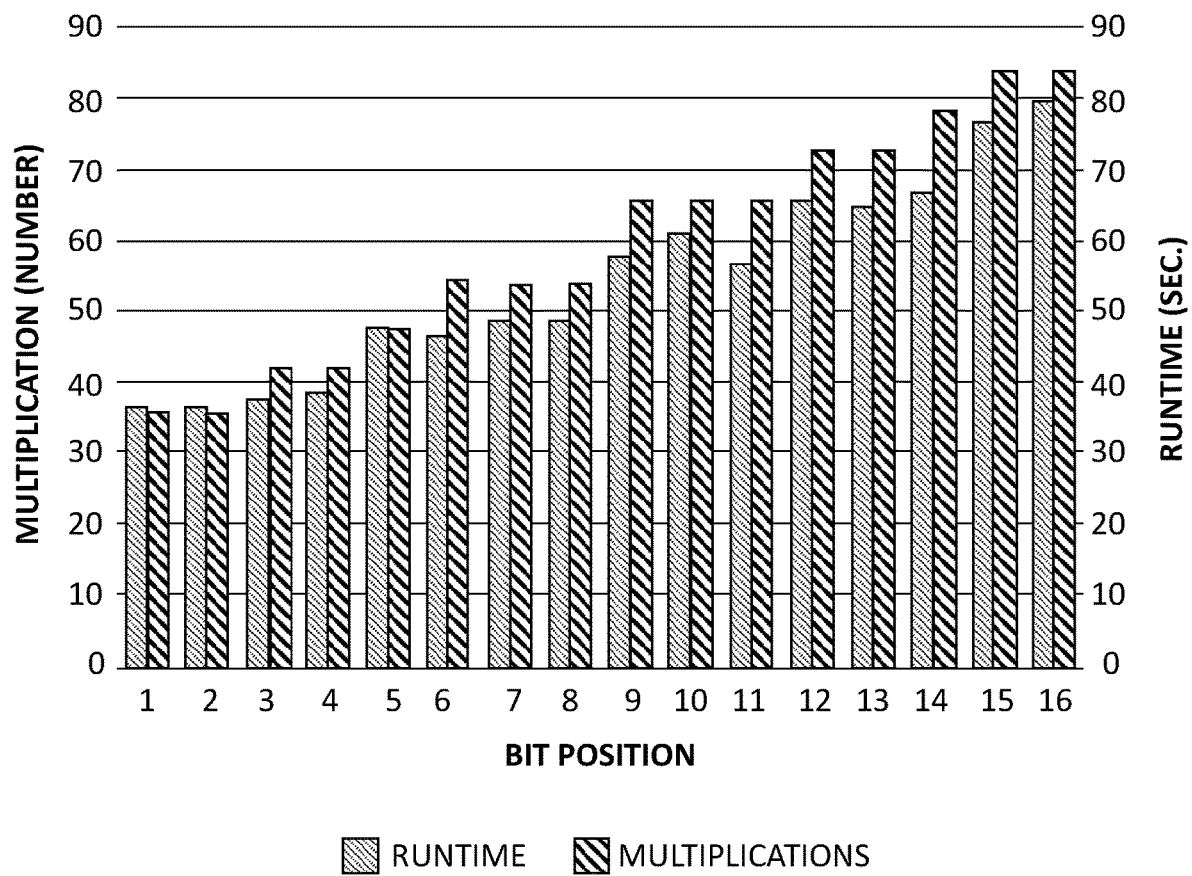
FIG. 5 shows latency per bit and the number of required multiplications per bit, according to experimental results.
Figure 6:
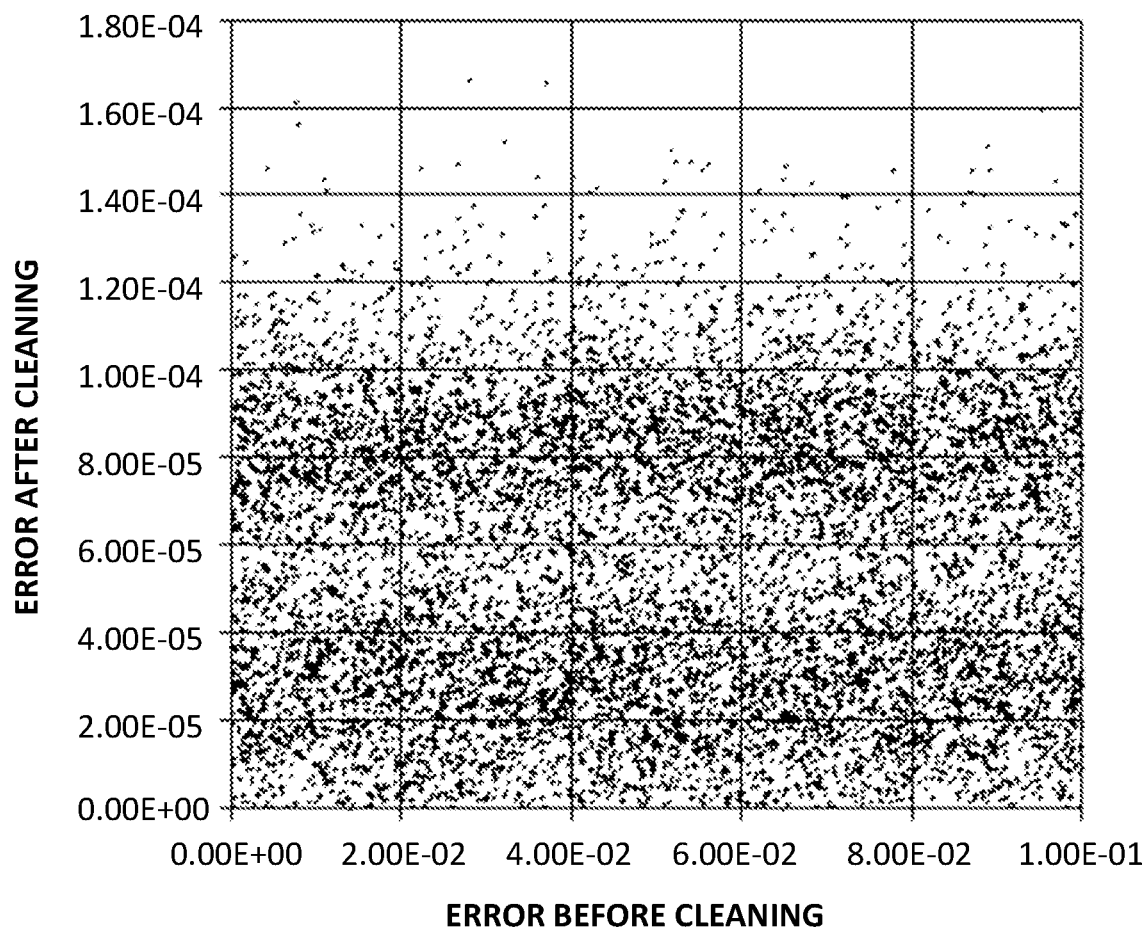
FIG. 6 shows a correlation between an input error and output errors, according to experimental results.

The experiment results are presented in FIGS. 4, 5, and 6. FIG. 4 shows a histogram of the measured error after decrypting the results of Algorithm 3. As expected, all the observed errors are positioned to the left of the target error $\beta$=$10^{-3}$. In fact, they are orders of magnitude smaller than $\beta$. This is expected, since the bounds for the worst case where computed, as can be shown in the proof of theorem 3 above.

The latency per bit and the number of required multiplications per bit are shown in FIG. 5. It took around 30 seconds to clean up the first bit and 80 seconds to clean up the last bit. The number of performed multiplications was proportional to the latency e.g., 36 and 79 for the first and last bit, respectively. The reason for the almost 1:1 correlation is that the measured latency also includes the bootstrapping time.

As expected, there is an increment in the number of executed multiplications and measured latency for higher bits. The reason is that Algorithm 3 uses smaller precision parameters $\alpha$, $\beta$ for the more significant bits, resulting in a need for a more costly approximation for the sign function. In addition, the linear step-wise graph is the result of the sign approximation-polynomial degrees achieved from the lower bounds.

Using the data from FIG. 5, it can be estimated that cleaning 4-bit, 8-bit, and 16-bit integers will take around 160, 360, and 943 seconds, respectively (resp. 2.5, 6, and 10 minutes). However, if the amortized latency of performing $2^{14}$ cleanup using one ciphertext is considered, the results are 9.76, 21.9, and 57.55 msec, respectively, which makes Algorithm 3 practical for some applications.

Finally, FIG. 6 shows the correlation between the input error and the output errors in our experiments, where no special correlation was observed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
receiving, as input, a ciphertext x representing a computational result of an approximated fully-homomorphic encryption (FHE) scheme, wherein ciphertext x comprises a combination of an underlying number m and an accumulated computational error e;
iteratively,
(i) performing a bit extraction operation to extract a current most significant bit (MSB) x' of ciphertext x,
(ii) calculating accuracy parameters input precision $\alpha$, output precision $\beta$ associated with x',
(iii) applying a step function to said extracted MSB x', based, at least in part, on said calculated accuracy parameters $\alpha$, $\beta$, to reduce or remove said accumulated computational error e and to return a clean MSB b, and
(iv) repeating steps (i)-(iii) for all bits included in said underlying number m; and
reconstructing and outputting, from all of said returned clean MSBs b, said number m,
wherein m has fewer bits than x.

2. The computer-implemented method of claim 1, wherein said number m is (i) an integer, or (ii) a fixed point element.

3. The computer-implemented method of claim 1, wherein said accumulated computational error e of ciphertext x represents the result of one of one or more computational operations in said approximated FHE scheme.

4. The computer-implemented method of claim 3, further comprising: (i) applying, after each of said one or more computational operations, a heuristic analysis to determine a size of said accumulated computational error e, and (ii) performing steps (i)-(iv) when said accumulated computational error e exceeds a predetermined threshold value.

5. The computer-implemented method of claim 1, wherein said step function is a polynomial which provides a branch functionality.

6. The computer-implemented method of claim 1, wherein said accuracy parameter $\alpha$ defines an available accuracy of an input to said step function, and said accuracy parameters $\beta$ defines a required accuracy of an output of said step function.

7. The computer-implemented method of claim 1, wherein said ciphertext x represents one of a set of index values associated with a plurality of entries in a lookup table, and wherein step (iii) applies a function which returns 1 when said ciphertext x is equal to one of said index values, and returns 0 otherwise.

8. A system comprising:
at least one hardware processor; and
a non-transitory computer-readable storage medium having program code embodied therewith, the program code executable by said at least one hardware processor to:
receive, as input, a ciphertext x representing a computational result of an approximated fully-homomorphic encryption (FHE) scheme, wherein ciphertext x comprises a combination of an underlying number m and an accumulated computational error e,
iteratively,
(i) perform a bit extraction operation to extract a current most significant bit (MSB) x' of ciphertext x,
(ii) calculate accuracy parameters input precision $\alpha$, output precision $\beta$ associated with x',
(iii) apply a step function to said extracted MSB x', based, at least in part, on said calculated accuracy parameters $\alpha$, $\beta$, to reduce or remove said accumulated computational error e and to return a clean MSB b, and
(iv) repeat steps (i)-(iii) for all bits included in said underlying number m, and
reconstruct and output, from all of said returned clean MSBs b, said number m,
wherein m has fewer bits than x.

9. The system of claim 8, wherein said number m is (i) an integer, or (ii) a fixed point element.

10. The system of claim 8, wherein said accumulated computational error e of ciphertext x represents the result of one or more computational operations in said approximated FHE scheme.

11. The system of claim 10, wherein said program instructions are further executable to (i) apply, after each of said one or more computational operations, a heuristic analysis to determine a size of said accumulated computational error e, and (ii) perform steps (i)-(iv) when said accumulated computational error e exceeds a predetermined threshold value.

12. The system of claim 8, wherein said step function is a polynomial which provides a branch functionality.

13. The system of claim 8, wherein said accuracy parameter $\alpha$ defines an available accuracy of an input to said step function, and said accuracy parameters $\beta$ defines a required accuracy of an output of said step function.

14. The system of claim 8, wherein said ciphertext x represents one of a set of index values associated with a plurality of entries in a lookup table, and wherein step (iii) applies a function which returns 1 when said ciphertext x is equal to one of said index values, and returns 0 otherwise.

15. A computer program product comprising a non-transitory computer-readable storage medium having program code embodied therewith, the program code executable by at least one hardware processor to:
receive, as input, a ciphertext x representing a computational result of an approximated fully-homomorphic encryption (FHE) scheme, wherein ciphertext x comprises a combination of an underlying number m and an accumulated computational error e;
iteratively,
(i) perform a bit extraction operation to extract a current most significant bit (MSB) x' of ciphertext x,
(ii) calculate accuracy parameters input precision $\alpha$, output precision $\beta$ associated with x',
(iii) apply a step function to said extracted MSB x', based, at least in part, on said calculated accuracy parameters $\alpha$, $\beta$, to reduce or remove said accumulated computational error e and to return a clean MSB b, and
(iv) repeat steps (i)-(iii) for all bits included in said underlying number m; and
reconstruct and output, from all of said returned clean MSBs b, said number m, wherein
m has fewer bits than x.

16. The computer program product of claim 15, wherein said number m is (i) an integer, or (ii) a fixed point element.

17. The computer program product of claim 15, wherein said accumulated computational error e of ciphertext x represents the result of one or more computational operations in said approximated FHE scheme.

18. The computer program product of claim 17, wherein said program instructions are further executable to (i) apply, after each of said one or more computational operations, a heuristic analysis to determine a size of said accumulated computational error e, and (ii) perform steps (i)-(iv) when said accumulated computational error e exceeds a predetermined threshold value.

19. The computer program product of claim 15, wherein said step function is a polynomial which provides a branch functionality.

20. The computer program product of claim 15, wherein said accuracy parameter $\alpha$ defines an available accuracy of an input to said step function, and said accuracy parameters $\beta$ defines a required accuracy of an output of said step function.

* * * * *